L. F. TOOTH.
GAS BURNER.
APPLICATION FILED DEC. 13, 1911.
1,057,302.
Patented Mar. 25, 1913.
3 SHEETS—SHEET 2.
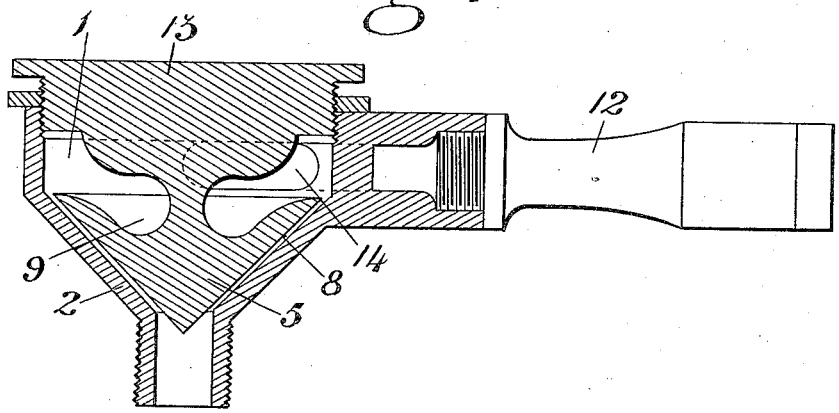
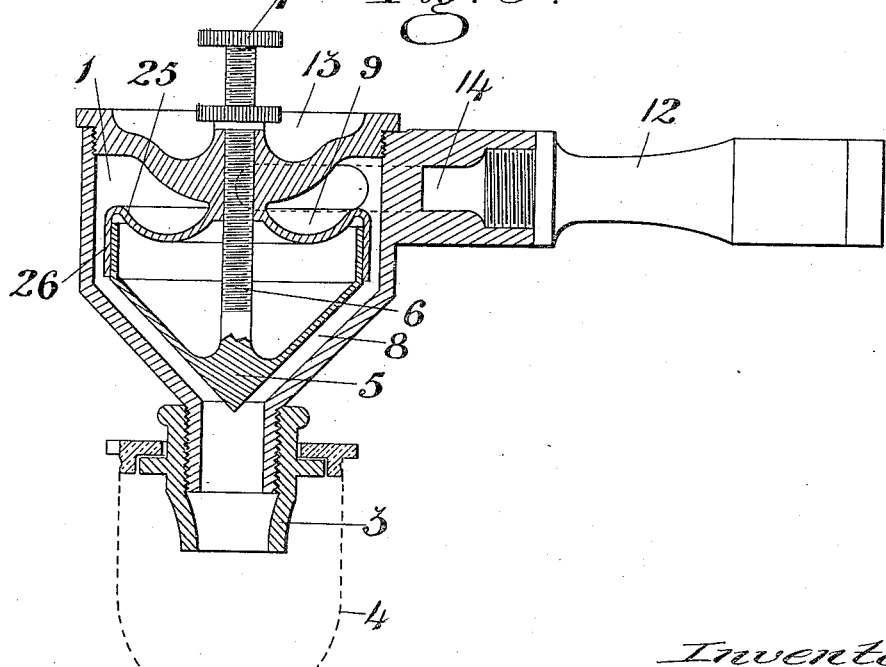
Witnesses
Inventor
Louis F. Tooth
by
Atty L. F. TOOTH.
GAS BURNER.
APPLICATION FILED DEC. 13, 1911.
1,057,302.
Patented Mar. 25, 1913.
3 SHEETS—SHEET 3.
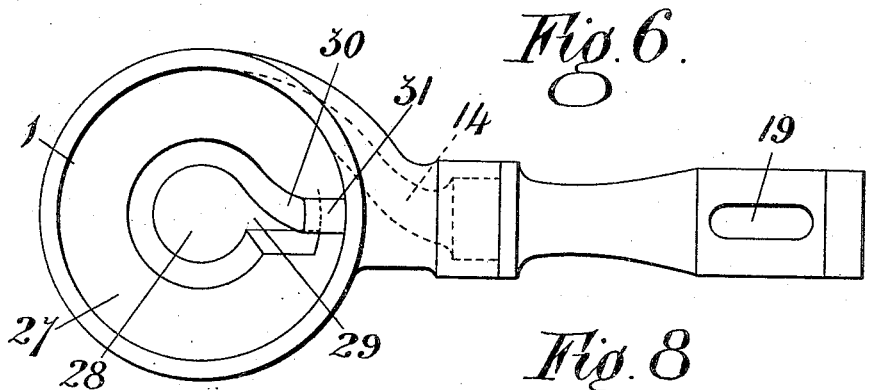
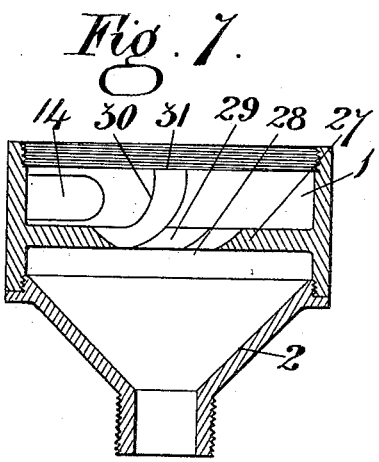
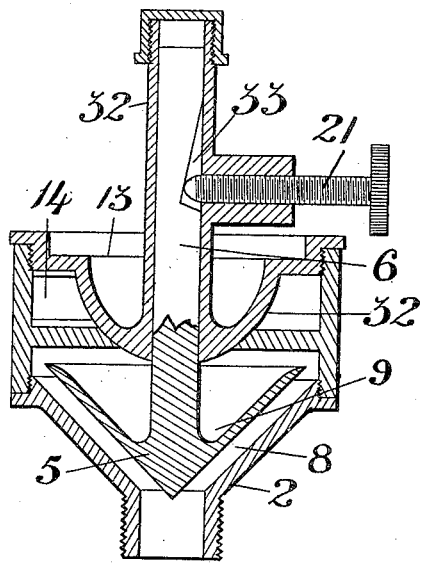
Witnesses:
Inventor
Louis F. Tooth
by
Attorney

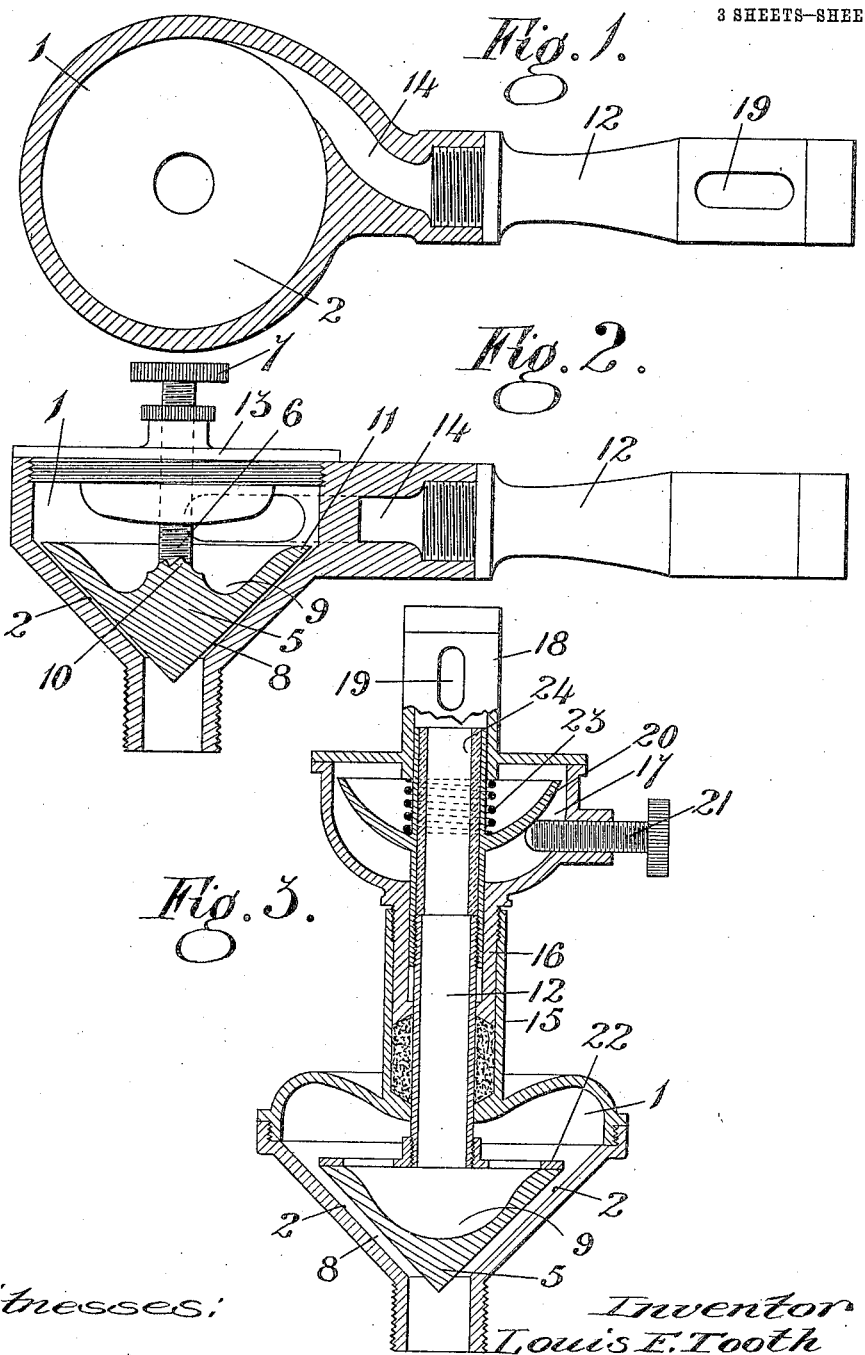

UNITED STATES PATENT OFFICE.

LOUIS FREDERICK TOOTH, OF LONDON, ENGLAND.

GAS-BURNER.

1,057,302.  Specification of Letters Patent.  Patented Mar. 25, 1913.

Application filed December 13, 1911. Serial No. 665,487.

*To all whom it may concern:*

Be it known that I, LOUIS FREDERICK TOOTH, a subject of the King of Great Britain, residing at London, England, have invented certain new and useful Improvements in or Connected with Gas-Burners, of which the following is a specification.

This invention relates to that class of gas burner for incandescent gas lighting in which a heating chamber is disposed over the mantle or flame and contains a coned block or its equivalent of approximately the same shape as the chamber for causing the mixture of gas and air to pass to the burner nozzle in hollow column or film form, the principal object being to prevent back lighting at the gas spit. In such class of burners hitherto known the block inside the chamber has been of a fixed or movable character and the gas is passed from the mixing tube gradually outward or inward in film form around the block and on to the burner.

Now the object of my invention is to so construct such a block and in some cases the chamber also, that a further mixing of the gas and air is insured by causing such mixture after leaving the Bunsen or mixing tube or tubes to have a direction of flow in a whirling manner totally contrary or different to its direction of flow in the burner tube before it reaches the annular conical space between the block or valve and the walls of the casing.

By adjusting the block or valve and causing the gaseous mixture to flow in different directions before it reaches the annular space, the inlet of air is automatically regulated without use of valves at the air inlet as the pressure of gas and the check to its pressure caused by diverting the direction of flow only permit of sufficient air being drawn into the mixing tube for proper combustion.

My invention will be clearly understood from the following description aided by the examples of construction shown on the annexed drawings in which:—

Figure 1 is a part sectional plan of a burner casing in its simplest form and without the valve and cover, the gas and air mixture entering at the side of the casing. Fig. 2 is a side sectional elevation of a burner with the casing constructed as in Fig. 1. Fig. 3 is a sectional elevation of a modified form of burner in which the gas and air enter from the top of the burner. Figs. 4 and 5 are side sectional elevations of further modified forms of burners. Fig. 6 is a plan of the casing of a still further modified form of burner. Fig. 7 a side sectional elevation of the same; and Fig. 8 also a side sectional elevation of said casing with the valves and other parts assembled.

For the purpose of my invention I provide a chamber 1 having a conical or equivalent shaped lower part 2, the apex of which is formed with or carries the burner 3 proper, and the mantle 4. Inside this chamber 1, I position a block or valve 5 of cone or equivalent shape at one part to correspond with the conical or equivalent shaped lower part 2 of the chamber and this block is carried by a screw threaded rod 6 or other means operable by nut 7 from outside of the chamber 1 to adjust the block 5 to determine the space 8 between the conical portion of the block 5 and the corresponding part 2 of the chamber.

The block or valve 5 may be of any shape at the upper part but I prefer that its top may have an annular recess 9 extending from near a raised portion 10 in the center to the edge 11 and that the Bunsen tube 12 be led into the chamber 1 in such a manner that the gas and air passing into the chamber would be forced to travel in a whirling manner around the top of the block before passing through the annular space 8 between the block and chamber wall to the burner, such Bunsen tube being arranged in a horizontal, angled, or vertical position as desired, or the Bunsen tube may be connected to the chamber in any other manner whether or not the gas is given a whirling motion in the chamber. The chamber with its cone inverted is positioned over the mantle so that the uprising products of combustion impart heat to it and the gaseous mixture as it passes to the burner whereby it becomes regenerative.

By adjusting the block or valve to determine the space or opening 8 between the conical walls of the block and mixing chamber, the proper sized passage is formed to suit the size of the Bunsen tube and permits the pressure of gas to draw in the correct proportion of air to obtain complete combustion. The block or valve 5 can be adjusted to be ready for use at given pressures or qualities of gas and thus be standardized to suit given districts.

The chamber may be of two-part construction and be provided with male and female screw threads in such manner that the cone part or member of the chamber may be moved to regulate the size of the passage between the block and the wall of the chamber. In this case the block is formed with or attached to the upper portion of the chamber as will be understood by referring to Fig. 8 and may be considered as a fixture, the cone portion 2 being movable about the screw thread by which it is attached to the casing.

According to Figs. 1 and 2 the block or valve 5 is carried by a cover 13 which is screwed into the top of the casing 1, and the gas and air passing along the passage way 14 to the side of the casing 1 will partake of a whirling motion assisted by the annular recess 9 before taking a downward course through the space 8 to the burner.

According to Fig. 3 in which the Bunsen tube is arranged vertically and not at right angles to the casing as in Figs. 1 and 2, the burner comprises a casing 1 having a coned portion 2 and an upwardly extending tube 15 which latter has screwed into it a tube 16 carrying a cuplike case or chamber 17; this case or chamber 17 is formed with or has attached thereto a tubular stem 18 which is provided with the air holes 19 and is screw threaded internally for attachment to the usual gas nipple. Inside the tubes 15, 16 and 18 is positioned the Bunsen tube 12, that tube being made preferably in two sections as shown, the upper section carrying a curved flange 20 which is acted upon by a screw 21 passing through the side of the case or chamber 17, the lower section of the Bunsen tube 12 carrying the valve 5 by a bridge 22 secured thereto, which valve 5 in this instance is provided with a hollow or recess 9 in its upper part. Between the flange 20 and the stem 18 is positioned a spring 23 which normally tends to keep the valve 5 near the coned portion of the casing 2. Inside the tube 15 and below the tube 16, I provide an asbestos or like packing which tends to prevent the Bunsen tube 12 from getting too hot and in this object it is assisted by the steatite or other lining 24 in the tube 12. In this construction the valve is lifted by operating the screw 21 and returned on a reverse movement of the screw 21 by the spring 23, and the gaseous mixture will impinge upon the recess 9 and travel upward into the chamber 1 and then down again through the space 8 to the burner.

According to Fig. 4, I construct the valve 5 and the cover 13 as one, the cover being screwed in the chamber 1 to adjust the valve, and I provide an annular space between the valve and the cover with the valve 5 having an annular recess 9 as in Figs. 1 and 2 so that the gaseous mixture entering the chamber in the same manner as in Figs. 1 and 2 will be given a whirling motion before reaching the space 8.

Fig. 5 shows a modified construction of Fig. 4. In this case the annular space is the same as in Fig. 5 but is formed between the cover proper and a plate 25 connected therewith. The valve 5 is provided with a screw stem and connected to the cover 13 as in Fig. 2, and such valve moves in a turned over lip 26 on the plate 25, which plate has the shape of the top of the valve when the valve itself causes a divergence of the flow of gaseous mixture.

According to Figs. 6, 7 and 8, I construct the heating chamber in two compartments by positioning a diaphragm 27 across the center and below the gaseous mixture inlet and in this diaphragm I form a hole 28 having a curved wall and a branch opening 29. On one side of this branch a wall 30 reaches above the diaphragm 27, the other side of the branch being part of the diaphragm 27. The curved edge of the opening 28 forms a seat for a spherical protuberance 32, on the cover, which cover also has a bearing upon the top 31 of the wall 30 so that when the spherical portion of the cover occupies its seat all communication between the two chambers is cut off except through the branch opening 29. The stem 6 of the valve 5 which is positioned in the lower compartment is passed up through a tube 32 projecting from the cover 13 and is provided with an angled portion 33 acted upon by a screw 21 projecting through the tube 32 for raising and lowering the valve. In this construction the gaseous mixture will first have a whirling motion through the upper chamber and after passing through the branch opening 29 will continue its whirling motion in the lower chamber in the same manner as in Figs. 1, 2 and 3.

What I do claim as my invention and desire to secure by Letters Patent is:—

1. In a gas burner, the combination of a heating chamber having inlet and outlet passages for the gaseous mixture; and a valve disposed within the interior of said chamber and conforming to the shape of a portion thereof, to provide an annular space between the mutually-opposed side walls of such portion and said valve leading to the outlet passage, the top of said valve being provided with an annular recess communicating with the inlet passage, said inlet passage being arranged tangentially to said chamber, to impart a whirling motion to said mixture during its travel through the chamber.

2. In a gas burner, the combination of a heating chamber having inlet and outlet passages for the gaseous mixture; a valve disposed within the interior of said chamber and conforming to the shape of a portion thereof, to provide an annular space between the mutually-opposed side walls of such portion and said valve leading to the outlet passage, the top of said valve being provided with an annular recess communicating with the inlet passage; and means for adjusting said valve, to vary the width of said space.

3. In a gas burner, the combination of a heating chamber having inlet and outlet passages for the gaseous mixture; a valve disposed within the interior of said chamber and conforming to the shape of a portion thereof, to provide an annular space between the mutually-opposed side walls of such portion and said valve leading to the outlet passage, the top of said valve being provided with an annular recess communicating with the inlet passage, said inlet passage being arranged tangentially to said chamber, to impart a whirling motion to said mixture during its travel through the chamber; and means for adjusting said valve, to vary the width of said space.

4. In a gas burner, the combination of a heating chamber having inlet and outlet passages for the gaseous mixture, the first-named passage being arranged tangentially to said chamber to impart a whirling motion to said mixture during its passage through the chamber; and a valve disposed within the interior of said chamber and constituting a part complemental to the same, one of which parts is provided with an annular recess that communicates with the inlet passage, said valve conforming to the shape of a portion of said chamber to provide an annular space between the mutually-opposed walls of such portion and said chamber leading to the outlet passage.

In testimony whereof I have hereunto set my hand in presence of two subscribing witnesses.

LOUIS FREDERICK TOOTH.

Witnesses:
P. E. MATTOCKS,
F. C. SMITH.

---

Copies of this patent may be obtained for five cents each, by addressing the "Commissioner of Patents, Washington, D. C."